United States Patent [19]

Hoppe et al.

[11] 4,305,983
[45] Dec. 15, 1981

[54] THIN WALLED TUBING FORMED OF A MELT SPINNABLE SYNTHETIC POLYMER AND PROCESS FOR THE MANUFACTURING THEREOF

[75] Inventors: Hans J. Hoppe, Obernburg; Karl Ostertag, Erlenbach, both of Fed. Rep. of Germany

[73] Assignee: Akzo NV, Arnhem, Netherlands

[21] Appl. No.: 77,774

[22] Filed: Sep. 21, 1979

[30] Foreign Application Priority Data

Sep. 21, 1978 [DE] Fed. Rep. of Germany ....... 2841091

[51] Int. Cl.³ .......................... D02G 3/00; B28B 3/20
[52] U.S. Cl. .................................. 428/36; 264/176 F; 264/210.8; 264/563; 428/398; 428/376
[58] Field of Search .................... 428/36, 376, 398; 264/210.8, 176 F, 563, 564

[56] References Cited

U.S. PATENT DOCUMENTS

| | | | |
|---|---|---|---|
| 3,630,824 | 12/1971 | Rohlig | 428/398 |
| 3,674,628 | 7/1972 | Fabre | 428/398 |
| 3,728,428 | 4/1973 | Turner | 428/398 |
| 3,930,105 | 12/1975 | Christen et al. | 428/398 |
| 4,055,696 | 10/1977 | Kamada et al. | 264/210.8 |
| 4,251,481 | 2/1981 | Hamlyn | 264/210.8 |

FOREIGN PATENT DOCUMENTS

| | | |
|---|---|---|
| 796181 | 10/1968 | Canada . |
| 2630374 | 3/1977 | Fed. Rep. of Germany . |
| 2638662 | 3/1978 | Fed. Rep. of Germany . |
| 442379 | 1/1968 | Switzerland . |
| 1314820 | 4/1973 | United Kingdom . |

Primary Examiner—William R. Dixon, Jr.
Attorney, Agent, or Firm—Michael J. Striker

[57] ABSTRACT

Thin walled tubing formed of a melt spinnable synthetic polymer having a flow-through cross-section amounting to 30 to 95% of the total tubular cross-section and a breaking elongation of less than 100% prepared by melt spinning a synthetic polymer so as to form a tube and then drawing off the tube thus formed at a velocity which is greater than 3500 m/min. Preferably the process is carried out under utilization of the phenomena of natural fiber bending whereby the distance between the spinning means and the take-off means can be decreased.

18 Claims, 4 Drawing Figures

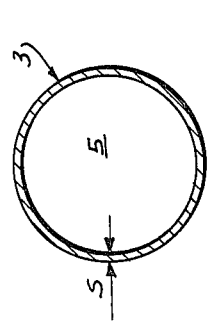
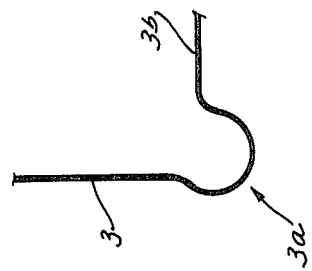
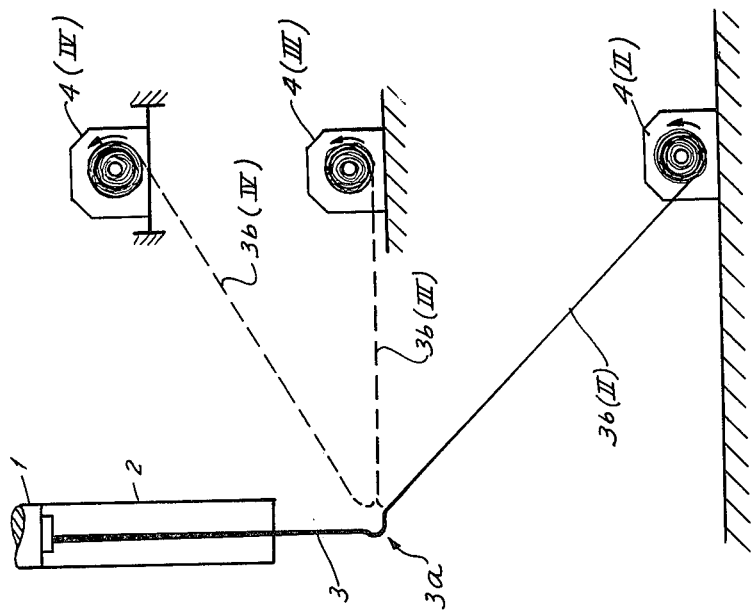
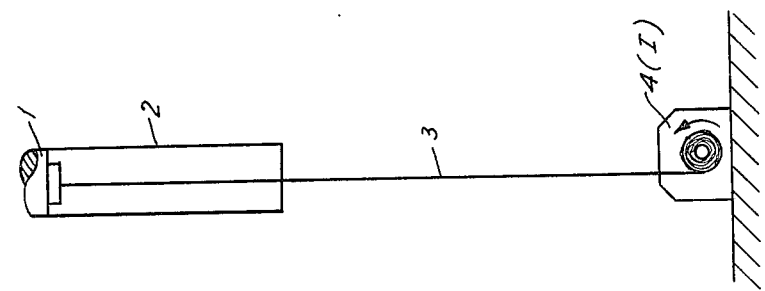

THIN WALLED TUBING FORMED OF A MELT SPINNABLE SYNTHETIC POLYMER AND PROCESS FOR THE MANUFACTURING THEREOF

This invention relates to a thin walled tubing formed of a melt spinnable synthetic polymer as well as to a process for its manufacture. The term "thin walled tubing" in the sense of the invention is to be understood to mean a hollow cylindrical structure of optional length having a circular or elliptical cross-section which over its longitudinal and radial direction has an essentially constant wall thickness amounting to less than about 15% of the largest outside dimension of the tubing. The circular cross-section in this connection corresponds to the largest outside dimension of the outer diameter and the elliptical cross-section corresponds to the largest outer axis.

The known thin walled tubing which for instance is utilized for the manufacture of heat exchange apparatus consists as a rule of tubing having a circular cross-section with an outside diameter of about 40–1000 $\mu$m or more and having a wall thickness of about 5–50 $\mu$m or more. Thin walled tubing of this type has been described for instance in Canadian Patent Specification No. 796,181, Swiss Patent Specification No. 442-379 and Great Britian Patent Specification No. 1,314,820.

The manufacture of such thin walled tubing takes place as a rule at relatively slow spinning speeds, i.e. speeds of much less than 1000 m/min. giving rise to tubing having a breaking elongation of, as a rule, well over 200% and characterized by unsatisfactory tensile strength. The drawing of these known products with the objective of increasing the tensile strength introduces into the manufacturing processes difficulties (reduced drawing speeds) and results generally besides in that the thin-walled tubing on the loss of its free flow-through cross-section collapses and/or the tubing wall becomes damaged so that the final tubing products no longer can be used for its intended application.

Accordingly it is an object of the present invention to provide a simple and economically feasible process for manufacturing thin walled tubing possessed of increased strength characteristics and at the same time of large flow-through cross-sections and an intact undamaged tubular wall.

It is another object of the invention to provide thin walled tubing on the basis of melt spinnable synthetic polymers characterized by increased strength properties, large flow-through cross-sections and undamaged tubular walls.

A further object of the invention is to provide a process allowing for the manufacture of thin walled tubing without the necessity for additional drawing and which can be operated with considerably higher take-off speeds of the spun tubing than heretofore has been possible.

Yet another object of the invention is to provide a process eliminating the costly and time-consuming delays in the manufacture of thin-walled tubing.

Other objects and advantages of the present invention will be obvious from the following detailed discussion with reference to the drawings, in which:

FIG. 1 is a schematic representation of a high-speed spinning installation with the take-off means located under and perpendicular to the spinning nozzle;

FIG. 2 is a schematic representation of an arrangement wherein the take-off means is positioned laterally to the spinning nozzle (positioned at different heights);

FIG. 3 is an enlarged section of a freshly spun thin walled tube in the range of the natural fiber bending; and FIG. 4 is a cross-section through a finished thin walled tubing.

In accordance with the invention there are provided thin walled tubing of increased strength, unimpaired wall structure, and enlarged throughput cross-sections utilizing a process involving high-speed melt spinning and more particularly rapid take-off speeds of the spun polymer.

It must be considered most surprising that such delicate structures as herein contemplated can be manufactured utilizing such high take-off speeds, i.e. utilizing take-off speeds not heretofore contemplated and which at this time are the highest obtainable, and namely amounting to 3500 m/min. or more, and that this process in addition provides thin walled tubing products of an extremely high qualitative value.

A distinguishing characteristic of the thin walled tubing products produced by the rapid spinning in accordance with the invention is that they are possessed of breaking in elongations of less than 100%.

The thin walled tubing in accordance with the invention are also characterized by flow-through cross-sections amounting to 30 to 95% of the total tubular cross-section. Preferably, the thin walled tubing of the invention has a through-flow cross-section amount to 60 to 95% of the total tubular cross-section.

The thin walled tubing of the invention can be made from any and all of the currently available melt spinnable polymers. Especially suitable for the purposes of the invention because of the specific end use properties imparted to the final product are the polyamides, for instance polycaprolactam and polyhexamethyleneadipicacidamide; the polyesters, for instance polyethyleneterephthalate, the polyolefins, for instance polyethylene and polypropylene and polyvinylchloride.

On account of their chemical stability especially in connection with their use in foodstuff applications and for holding carbonic acid containing liquids there come into consideration the polyesters and especially polyethyleneterephthalate. If chemical stability as well as temperature stability are required for the end use application, it is preferred that the tubing be made of polyolefin and preferably of polypropylene.

In the case where higher strength values are desired, the tubing is preferably made on the basis of a polyamide and preferably in this case from polyhexamethyleneadipicacidamide.

The polymeric materials can additionally contain stabilizers, carbon black or other like fillers, pore forming agents and other similar additives.

As produced the tubing conventionally possesses an outer wall which is impermeable to fluids. If the tubings are intended for use as filtering units it is, however, advantageous that the thin-walled tubes be provided with microporous outer walls. This is accomplished by providing in the polymer melt suitable pore forming agents.

It has already been mentioned that the tubings in accordance with the invention in contrast with the state of the art which provides that spinning speeds of under 1000 m/min. be utilized (see German Auslegeschrift No. 2,630,374) are conducted by a high-speed spinning procedure. The take-off speeds in accordance with the invention are greater than 3500 m/min. and preferably amount to 5000–7000 m/min. These take-off speeds which represent a multiple of the heretofore used working speeds provide thin walled tubing having increased strength and which formerly could only be realized through including in the process additional but difficult after drawing steps. Such high take-off speeds as contemplated require especially if large cross-sections and high wall strengths are important that there be provided for increased polymer throughputs and considerable spinning heights (distance of the spinning nozzle ./. take-off means).

In accordance with a preferred embodiment for carrying out the process of the invention, the spinning height is decreased by the use of the phenomena of natural fiber bending or deflection.

This phenomena of natural fiber bending (deflection) in general is associated with and occurs in all melt spinning of fibers on the basis of synthetic polymers at a more or less greater distance from the spinning nozzle if the take-off means which is conventionally arranged in a substantially perpendicular position directly under the spinning nozzle is moved out from this position to a side position relative to the spinning nozzle. The bending phenomena is clearly visible, for instance in the manufacture of a mono filament polyester fiber having an endtiter of 100 d tex which is drawn off at a speed of 3700 m/min. the take-off means which is arranged under and perpendicular to the spinning nozzle is gradually moved in a horizontal direction and possibly simultaneously is raised in the vertical direction.

In spite of the thusly modified position of the take-off means (spool or reel winde-up device), the fiber moves below the spinning nozzle over a fixed vertical distance and then is bent or deflected in the direction of the take-off means. The range or region of this "natural" fiber bending which takes place without any additional mechanical fiber conducting or directing means extends only for a distance of a few centimeters and does not change substantially even if position of the take-off device is markedly altered. The place or the region of the "natural fiber bending" can be varied through changing the spinning conditions, for example it can be shifted by increasing the melt throughput of the spinning nozzle. This phenomenon also appears by high-speed spinning of thin-walled tubings.

Under use of this phenomenon the spinning height (distance between the spinning nozzle ./. take-off means) can be lowered, i.e. one can with the installed spinning height utilize side or laterally positioned take-off means at increased polymer throughputs and rely on the phenomena of natural fiber bending or one can use a constant polymer throughput with a suitably reduced spinning chamber height and achieve the objectives of the invention. Generally expressed one can with the help of this phenomena of natural fiber bending utilize high polymer throughputs without having to provide for a subsequent cooling of the spun tubing or for after stretching or drawing of the spun tubing. In German Offenlegungsschrift 26 38 662 there has been proposed that conventional melt spun fibers directly at the bottom end of the blowing shaft be laterally drawn off and then fed to a diagonally located wind-up device that for instance can be located near the extruder. Assuming that this takes place with the help of a take-off galette there has in the known process by the time of the deflection of the spun melt already taken place in the blow shaft a recrystallization of the fibers so that the fiber is no longer viscous and is so stable that one can mechanically handle it, i.e. natural bending is out of the question.

In contrast to this known proposal, the process in accordance with the invention relies on the phenomena of natural fiber bending and, therefore, provision for the bending to take place is provided for essentially nearer to the spinning nozzle, i.e. at a region of the tubing where the tubing per se is still deformable and where for all practical purposes it cannot be mechanically handled. Thus, a polyester tube in this specific region at a temperature of about 150° C. has a crystallization degree of less than 10%. If one attempts to mechanically turn the tubing in this range there results because of the sticking of the tube to the fiber turning device an immediate breakage in the spun tubing.

In contrast to the known proposals the process of the invention permits in accordance with the aforesaid teaching through the phenomena of natural fiber bending to operate with a substantial reduction of the spinning height. By use of this phenomena of the natural fiber bending there is further established that following the region of the natural fiber bending still another region lies in which the crystallinity and the double refraction of the tubing is clearly increased. In this region there can be carried out an after-drawing of the tubing by a factor of about 2–3. This results in an improvement of the textile properties of the tubing and in an extension of its usefullness. This is advantageously achieved if the distance of the take-off device is regulated with a view to the region of the natural fiber bending, i.e. if the distance of the take-off device from the bending device is selected so as to be sufficiently large that the tubing can be subjected to an after-drawing.

As has already been mentioned it is not possible in the range of the natural fiber bending of the spun tubing to bend mechanically, that is by means of a turning device to turn the fiber. It has been surprisingly found that the results can be improved through the arrangement of a deflecting plate or baffle under and perpendicular to the spinning nozzle in the range of the natural fiber bending and closer to the spinning nozzle. This embodiment permits a further shortening of the spinning height of up to a meter.

Further it has been found that the tube properties can be improved if the region of the natural fiber bending is carried out in a cooling liquid, for instance if a smaller water trough is arranged, for instance at the point in the system where the mentioned deflecting or baffle plate has been installed.

In producing stable formed tubes having large outer measurements and very small wall thicknesses, it has been found particularly advantageous if in the spinning of the thin walled tubing out of the nozzle a cavity forming fluid and preferably a gas is blown into the tubing.

The invention will be better understood by reference to the accompanying drawings. As can be seen from FIG. 1, a melt is extruded from a spinning nozzle 1 into a downshaft 2 in the upper portion of which blowing means not here illustrated can be provided. The freshly spun thin walled tubing 3 is after a delay during which it undergoes some hardening and is sufficiently cooled down, delivered to a drawing or take-off means, in this instance a spool or reel aggregate 4 which here is positioned in base position I under and perpendicular to the spinning nozzle. The tubing 3 runs thereby with little or no deviation from the spinning nozzle to the spool aggregate 4 located under and perpendicular to the spinning nozzle and is eventually wound-up thereon. If in accordance with the invention there is made use of "the phenomena of the natural fiber bending" then the spool aggregate 4 is shifted from the base position I (FIG. 1) outwardly and to the side to position II as shown in FIG. 2. The tubing 3 then moves not as what to have been expected in a parabela form or similar curve, i.e. freely dipping from the spinning nozzle 1 to the take-up spool aggregate 4, but it proceeds first in a direction perpendicular to the spinning nozzle as if the spool aggregate was located in the base position I. Then there is observed in the tubing a range 3a in which the tubing bends laterally away from the spool aggregate 4 and thereafter bends again in a circular-like arch into a path which leads in a practically straight line to the spool aggregate 4. This tube section is designated as 3b and is shown in the drawing by reference numeral II to the position II of the spool aggregate 4.

If the spool aggregate 4 is raised to either of the positions III or IV, then at constant spinning conditions the position or location of the region 3 is changed hardly if at all. Only the form of the bending as can be seen from the detail in FIG. 3 is changed on account of the reduction of the angle between the portion 3b and 3 occasioned by changing the height of the spool aggregate 4 from position II to position III to position IV.

In the example which is hereinafter set forth, the spinning height, i.e. the vertical distance between the spinning nozzle ./. and the spool aggregate 4 clearly can be reduced and also possibly at the same time the spinning distance from the spinning nozzle to the bending region ./. range 3a can be reduced.

It is not necessary that the tubing after the range 3a be lead directly to the take-up device. Rather, after the tubing has been sufficiently cooled, conventional conducting devices can be arranged prior to the wind-up device (not shown).

If in the arrangement according to FIG. 2 there is provided downstream of the bending region 3a a baffle plate perpendicular or diagonally to the course of the tubing 3 and this baffle plate is carefully positioned with respect to the region 3a of the tubing 3, then the region 3a of the natural fiber bending can be increased up to about a meter (not illustrated).

In FIG. 4 there has been illustrated a thin walled tubing in accordance with the invention of typical cross-section. The tubing 3 consists of an outer wall having reduced wall thickness s surrounding a free throughput cross-section 5. The illustration is taken from a thin walled tube which was withdrawn at a speed of 5200 m/min.

The invention will be further illustrated by reference to the following example:

EXAMPLE

Polyethyleneterephthalate having a slice solution viscosity of 1.63 is spun out at a spinning temperature of 280° C. and using a spinning opening of a hollow fiber nozzle (ring slit nozzle 1800 $\mu$m/1000 $\mu$m). The spinning output amounts to 40 g/m. During the thin wall tubing ejection from the ring split of the nozzle, 11 l/hr nitrogen is blown into the tubing. The freshly spun tubing then passes into a 3 m long fall shaft and is taken up by a spool or reel aggregate that is located from the spinning nozzle at a vertical and horizontal distance of about 5 m and is there wound-up at a velocity amounting to about 5100 m/min. In this procedure the freshly spun tubing falls from the nozzle for about 4.9 m in a perpendicular downward direction and bends itself at an angle of approximately 90° (under formation of a region 3a as seen in FIG. 3) and then in an approximately horizontal direction whereupon it moves on to the take-up spool.

Measurements taken establish that within the fall shaft there is a spinning lag of about 1:90 to 1:200 and between the region 3a and the spool aggregate an after-delay or lag of about 1:2 to 1:5, the last at a distance of about 0.5 to 3.5 m from the region 3a. The wound-up thin walled tubing possesses a calculated titer of 78 dtex, an outer cross-section of about 260 $\mu$m and a wall thickness of 6 to 7 $\mu$m. The breaking elongation amounts to 69% and the strength to 35 cN/tex.

We claim:

1. Thin walled tubing formed of a melt spinnable synthetic polymer having a flow-through cross-section amounting to 30 to 95% of the tubing's total cross-section and a breaking elongation of less than 100%.

2. Thin walled tubing according to claim 1, wherein said flow-through cross-section amounts to 60 to 95% of the tubing's total cross-section.

3. Thin walled tubing according to claim 1, wherein said synthetic polymer is a member selected from the group of polyesters, polyolefins, polyamides and polyvinylchloride.

4. Thin walled tubing according to claim 3, wherein said synthetic polymer is a polyester.

5. Thin walled tubing according to claim 4, wherein said synthetic polymer is polyethyleneterephthalate.

6. Thin walled tubing according to claim 3, wherein said synthetic polymer is a polyolefin.

7. Thin walled tubing according to claim 6, wherein said synthetic polymer is polypropylene.

8. Thin walled tubing according to claim 3, wherein said synthetic polymer is a polyamide.

9. Thin walled tubing according to claim 8, wherein said synthetic polymer is 6,6-polyamide.

10. Thin walled tubing according to claim 1, wherein said synthetic polymer contains a member selected from the group consisting of micro pore forming agents, fillers and stabilizing agents.

11. Thin walled tubing according to claim 10, wherein said synthetic polymer contains a micro pore forming agent.

12. Process for manufacturing the thin walled tubing according to claim 1, which comprises melt spinning a synthetic polymer so as to form a tube and drawing off the formed tubing at a velocity greater than 3500 m/m.

13. Process according to claim 12, wherein the draw-off velocity amounts to 5000 to 7000 m/min.

14. Process according to claim 11, which comprises conducting said spinning under utilization of the phenomena of natural fiber bending whereby the distance between the spinning means and the draw-off means can be decreased.

15. Process according to claim 12, which comprises arranging a deflection plate perpendicular to and below the spinning nozzle at a distance from the spinning nozzle whereby the region of the natural fiber bending is shifted so as to be closer to the spinning nozzle.

16. Process according to claim 12, which comprises providing a supply of cooling liquid in the region of the natural fiber bending.

17. Process according to claim 12, which comprises introducing a cavity forming fluid into the tubing as it is being spun from the nozzle.

18. Process according to claim 17, wherein said fluid is a gas.

* * * * *